(12) United States Patent
Tsai (10) Patent No.: US 12,196,922 B2
(45) Date of Patent: Jan. 14, 2025

(54) OPTICAL IMAGING LENS

(71) Applicant: Calin Technology Co., Ltd., Taichung (TW)

(72) Inventor: Po-Nien Tsai, Pingtung County (TW)

(73) Assignee: CALIN TECHNOLOGY CO., LTD., Taichung (TW)

(*) Notice: Subject to any disclaimer, the term of this patent is extended or adjusted under 35 U.S.C. 154(b) by 680 days.

(21) Appl. No.: 17/399,639

(22) Filed: Aug. 11, 2021

(65) Prior Publication Data

US 2022/0390715 A1 Dec. 8, 2022

(30) Foreign Application Priority Data

Jun. 4, 2021 (TW) .................................. 110120411

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 9/62; G02B 13/02; G02B 3/0087; G02B 13/006; G02B 2003/0093
See application file for complete search history.

(56) References Cited

U.S. PATENT DOCUMENTS 4,310,223 A * 1/1982 Conrad .................. G02B 13/24
359/740

2014/0198392 A1 7/2014 Han
2015/0293327 A1 10/2015 Tomioka

FOREIGN PATENT DOCUMENTS

| CN | 101553748 A | 10/2009 |
|----|-------------|---------|
| CN | 110873943 A | 3/2020 |
| TW | 201734533 A | 10/2017 |

OTHER PUBLICATIONS

English Translation of CN 110873943 A, already of record (Year: 2020).*
Extended European Search Report for European Application No. 21192412.1, dated Feb. 9, 2022.
Taiwanese Search Report for Taiwanese Application No. 110120411, dated Jan. 10, 2022, with English translation.

* cited by examiner

*Primary Examiner* — Collin X Beatty
(74) *Attorney, Agent, or Firm* — Birch, Stewart, Kolasch & Birch, LLP (57) ABSTRACT

An optical imaging lens, in order from an object side to an image side along an optical axis, includes a first optical assembly, a second optical assembly, a third optical assembly, a fourth optical assembly, a fifth optical assembly, and a sixth optical assembly. The first optical assembly has positive refractive power. The fourth optical assembly has positive refractive power. The sixth optical assembly has negative refractive power. Two of the first optical assembly, the second optical assembly, the third optical assembly, the fourth optical assembly, the fifth optical assembly, and the sixth optical assembly include a compound lens with at least two lenses, while the others are a single lens, thereby providing a better optical performance of high image quality and low distortion.

23 Claims, 12 Drawing Sheets

OPTICAL IMAGING LENS

BACKGROUND OF THE INVENTION

Technical Field

The present invention generally relates to an optical image capturing system, and more particularly to an optical imaging lens which provides a better optical performance of high image quality and low distortion.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role, collecting environmental information through various lenses and sensors to ensure the driving safety of the driver. Furthermore, as the image quality of the automotive lens changes with the temperature of an external application environment, the temperature requirements of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens that provides a better optical performance of high image quality and low distortion.

The present invention provides an optical imaging lens, in order from an object side to an image side along an optical axis, including a first optical assembly having positive refractive power; second optical assembly; a third optical assembly; a fourth optical assembly having positive refractive power; a fifth optical assembly; and a sixth optical assembly having negative refractive power, wherein two of the first optical assembly, the second optical assembly, the third optical assembly, the fourth optical assembly, the fifth optical assembly, and the sixth optical assembly include a compound lens with at least two lenses, while the others are a single lens; the optical imaging lens satisfies: $1.47 > F/f1 > 0.14$; $1.55 > F/f6 > 0.46$; $-0.42 > F/f8 > -1.86$; F is a focal length of the optical imaging lens; f1 is a focal length of the first optical assembly; f6 is a focal length of the fourth optical assembly; f8 is a focal length of the sixth optical assembly.

In addition, the another primary objective of the present invention is to provide an optical imaging lens, in order from an object side to an image side along an optical axis, including a first lens having positive refractive power, a second lens having positive refractive power, a third lens having negative refractive power, a fourth lens having negative refractive power, a fifth lens having positive refractive power, a sixth lens having positive refractive power, a seventh lens, and an eighth lens having negative refractive power. An object-side surface of the first lens is a convex surface. An object-side surface of the second lens is a convex surface. An image-side surface of the third lens is a concave surface. An object-side surface of the third lens and an image-side surface of the second lens are adhered together to form a second optical assembly. The fourth lens is a biconcave lens. The fifth lens is a biconvex lens. An object-side surface of the fifth lens and an image-side surface of the fourth lens are adhered together to form a third optical assembly. The sixth lens is a biconvex lens. An object-side surface of the seventh lens is a convex surface. An object-side surface of the eighth lens is a concave surface.

With the aforementioned design, the optical imaging lens of the present invention could achieve the effect of high image quality and low distortion.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
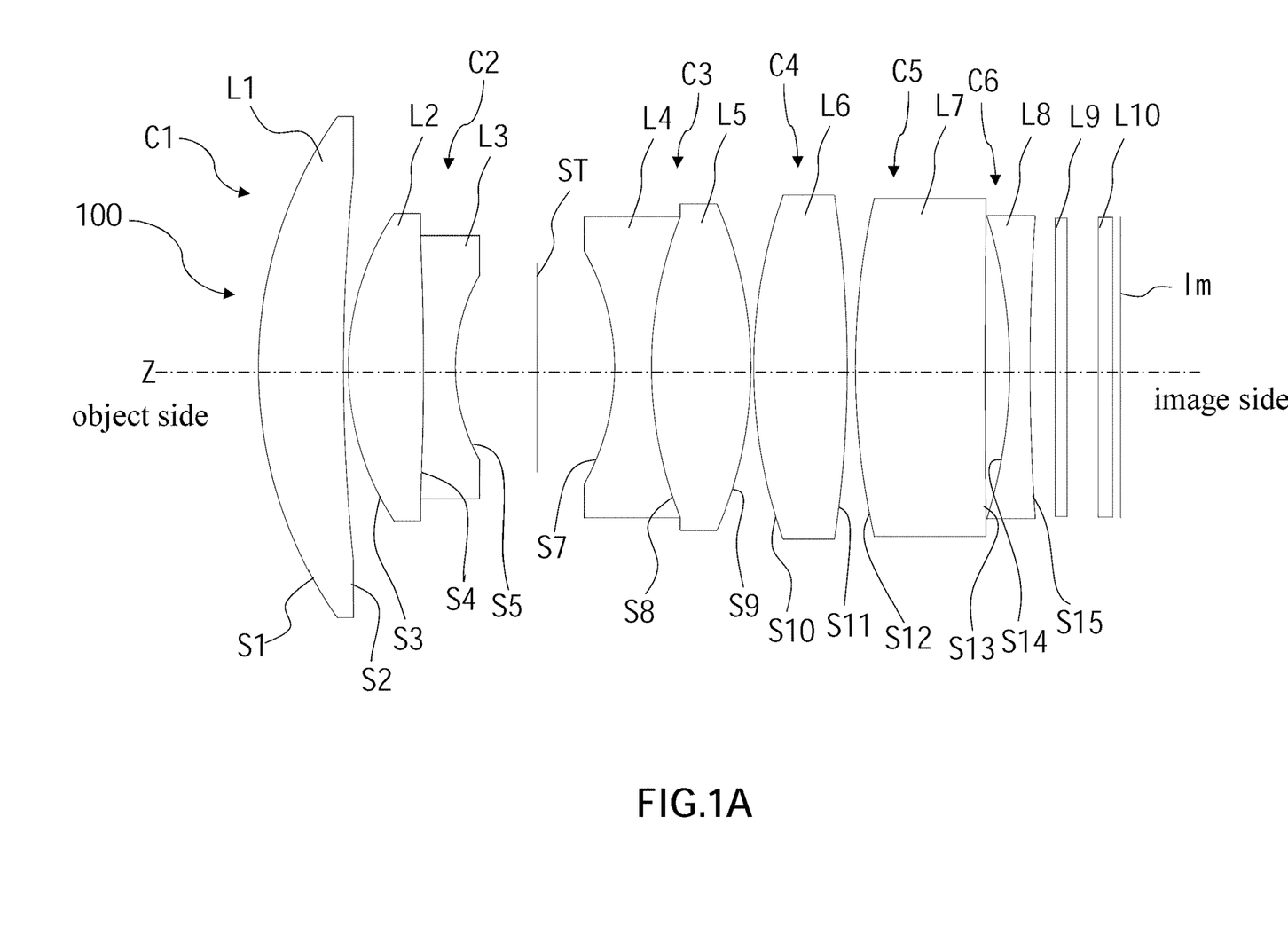
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first optical assembly C1, a second optical assembly C2, a third optical assembly C3, a fourth optical assembly C4, a fifth optical assembly C5, and a sixth optical assembly C6. In the current embodiment, two of the first optical assembly C1, the second optical assembly C2, the third optical assembly C3, the fourth optical assembly C4, the fifth optical assembly C5, and the sixth optical assembly C6 include a compound lens with at least two lenses, while the others thereof is a single lens.

The first optical assembly C1 has positive refractive power. As shown in FIG. 1A, the first optical assembly C1 is a single lens including a first lens L1, wherein an object-side surface S1 of the first lens L1 is a convex surface toward the object side, and an image-side surface S2 of the first lens L1 could be a flat surface or a concave surface toward the image side. In the current embodiment, the image-side surface S2 of the first lens L1 is a concave surface that is slightly concave toward the image side.

The second optical assembly C2 is a compound lens formed by adhering a second lens L2 and a third lens L3, which could effectively improve a chromatic aberration of the optical imaging lens 100. In the current embodiment, the second optical assembly C2 has a positive refractive power, and the second lens L2 has positive refractive power, and the third lens L3 has negative refractive power. As shown in FIG. 1A, an object-side surface S3 of the second lens L2 is a convex surface toward the object side, and an image-side surface S4 of the second lens L2 is a convex surface that is slightly convex toward the image side, and an object-side surface S4 of the third lens L3 is a concave surface that is slightly concave toward the object side, and an image-side surface S5 of the third lens L3 is a concave surface that is meniscus shaped toward the image side, wherein the object-side surface S4 of the third lens L3 and the image-side surface S4 of the second lens L2 are adhered together to form the second optical assembly C2. In other embodiments, the image-side surface S4 of the second lens L2 and the object-side surface S4 of the third lens L3 could be a flat surface, so that a cemented flat surface is formed between the second lens L2 and the third lens L3.

The third optical assembly C3 is a compound lens formed by adhering a fourth lens L4 and a fifth lens L5, which could effectively improve a chromatic aberration of the optical imaging lens 100. In the current embodiment, the third optical assembly C3 has positive refractive power, and the fourth lens L4 has negative refractive power, and the fifth lens L5 has positive refractive power. As shown in FIG. 1A, the fourth lens L4 is a biconcave lens (i.e., an object-side surface S7 of the fourth lens L4 and an image-side surface S8 thereof are a concave surface), and the fifth lens L5 is a biconvex lens (i.e., an object-side surface S8 of the fifth lens L5 and an image-side surface S9 thereof are a convex surface), wherein the object-side surface S8 of the fifth lens L5 and the image-side surface S8 of the fourth lens L4 are adhered together to form the third optical assembly C3.

The fourth optical assembly C4 has positive refractive power. As shown in FIG. 1A, the fourth optical assembly C4 is a single lens including a sixth lens L6, wherein the sixth lens L6 is a biconvex lens (i.e., an object-side surface S10 of the sixth lens L6 and an image-side surface S11 thereof are a convex surface).

The fifth optical assembly C5 is a single lens including a seventh lens L7. In the current embodiment, the fifth optical assembly C5 has positive refractive power, wherein an object-side surface S12 of the seventh lens L7 is a convex surface, and an image-side surface S13 of the seventh lens L7 could be a flat surface or a concave surface. In the current embodiment, the image-side surface S13 of the seventh lens L7 is a concave surface that is slightly concave toward the image side.

The sixth optical assembly C6 has negative refractive power. In the current embodiment, the sixth optical assembly C6 is a single lens including an eighth lens L8, wherein the eighth lens L8 could be a planoconcave lens, a biconcave lens, or a meniscus lens, which have a concave surface toward the object side. As shown in FIG. 1A, an object-side surface S14 of the eighth lens L8 is a concave surface that is meniscus shaped toward the object side, and an image-side surface S15 of the eighth lens L8 is a concave surface that is slightly concave toward the image side.

Additionally, the optical imaging lens 100 further includes an aperture ST, an infrared filter L9, and a protective glass L10, wherein the aperture ST is disposed between the third lens L3 of the second optical assembly C2 and the fourth lens L4 of the third optical assembly C3, which could reduce stray light and enhance image quality. The infrared filter L9 is disposed between the eighth lens L8 and the protective glass L10 and is located at a side of the image-side surface S15 of the eighth lens L8 of the sixth optical assembly C6, wherein the infrared filter L9 is made of glass. The protective glass L10 is disposed at a side of the infrared filter L9 and is located between the infrared filter L9 and an image plane Im of the optical imaging lens 100.

In order to keep the optical imaging lens 100 in good optical performance and high imaging quality, the optical imaging lens 100 further satisfies:

$$1.47 > F/f1 > 0.14; \quad (1)$$

$$1.26 > F/f23 > -1.31, 1.83 > F/f2 > 0.52, -1.58 > F/f3 > -2.85; \quad (2)$$

$$0.86 > F/f45 > -0.43, -0.52 > F/f4 > -1.68, 1.94 > F/f5 > 0.64; \quad (3)$$

$$1.55 > F/f6 > 0.46; \quad (4)$$

$$1.07 > F/f7 > -0.17; \quad (5)$$

$$-0.42 > F/f8 > -1.86; \quad (6)$$

wherein F is a focal length of the optical imaging lens 100; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f8 is a focal length of the eighth lens L8; f23 is a focal length of the second optical assembly C2; f45 is a focal length of the third optical assembly C3.

Parameters of the optical imaging lens 100 of the first embodiment of the present invention are listed in the following Table 1, including the focal length F of the optical imaging lens 100 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, the focal length of each lens, the cemented focal length of the second optical assembly C2, and the cemented focal length of the third optical assembly C3, wherein a unit of the focal length, the radius of curvature, and the distance is millimeter (mm).

TABLE 1

F = 16.354 mm; Fno = 1.63; FOV = 22 deg

| Surface | R(mm) | D(mm) | Nd | Focal length | Cemented focal length | Note |
|---|---|---|---|---|---|---|
| S1 | 16.07 | 2.9 | 2.01 | 18.91 | | L1 |
| S2 | 64.7 | 0.17 | 1 | | | |
| S3 | 9.62 | 2.59 | 1.62 | 15.96 | 21.39 | L2 |
| S4 | −97.14 | 1.09 | 1.82 | −7.72 | | L3 |
| S5 | 6.41 | 2.8 | 1 | | | |
| ST | Infinity | 2.67 | 1 | | | Aperture |
| S7 | −8.19 | 1.27 | 1.62 | −16.09 | 167.06 | L4 |
| S8 | 12.95 | 3.41 | 1.81 | 14.35 | | L5 |
| S9 | −12.95 | 0.1 | 1 | | | |
| S10 | 17.81 | 3.22 | 1.81 | 15.61 | | L6 |
| S11 | −38.71 | 0.29 | 1 | | | |
| S12 | 26.46 | 4.44 | 1.91 | 30.92 | | L7 |
| S13 | 406.82 | 0.85 | 1 | | | |
| S14 | −18.42 | 0.7 | 1.79 | −17.8 | | L8 |
| S15 | 74.86 | 0.87 | 1 | | | |
| S16 | Infinity | 0.4 | 1.52 | | | Infrared filter |
| S17 | Infinity | 1.06 | 1 | | | |
| S18 | Infinity | 0.5 | 1.52 | | | Protective glass |
| S19 | Infinity | 0.28 | 0 | | | |
| Im | Infinity | 0 | 0 | | | |

It can be seen from Table 1 that, in the current embodiment, the focal length F of the optical imaging lens 100 is 16.354 mm, and the Fno of the optical imaging lens 100 is 1.63, and the FOV of the optical imaging lens 100 is 22 degrees, wherein f1=18.91 mm; f2=15.96 mm; f3=−7.72 mm; f4=−16.09 mm; f5=14.35 mm; f6=−15.61 mm; f7=30.92 mm; f8=−17.8 mm; the focal length f23 of the second optical assembly C2 formed by adhering the second lens L2 and the third lens L3 is 21.39 mm; the focal length f45 of the third optical assembly C3 formed by adhering the fourth lens L4 and the fifth lens L5 is 167.06 mm.

Additionally, based on the above detailed parameters, detailed values of the aforementioned conditional formula in the first embodiment are as follows: F/f1=0.86; F/f2=1.02, F/f3=−2.12, F/f23=0.76; F/f4=−1.02, F/f5=1.14, F/f45=0.1; F/f6=1.05; F/f7=0.53; F/f8=−0.92.

Figure 1B:
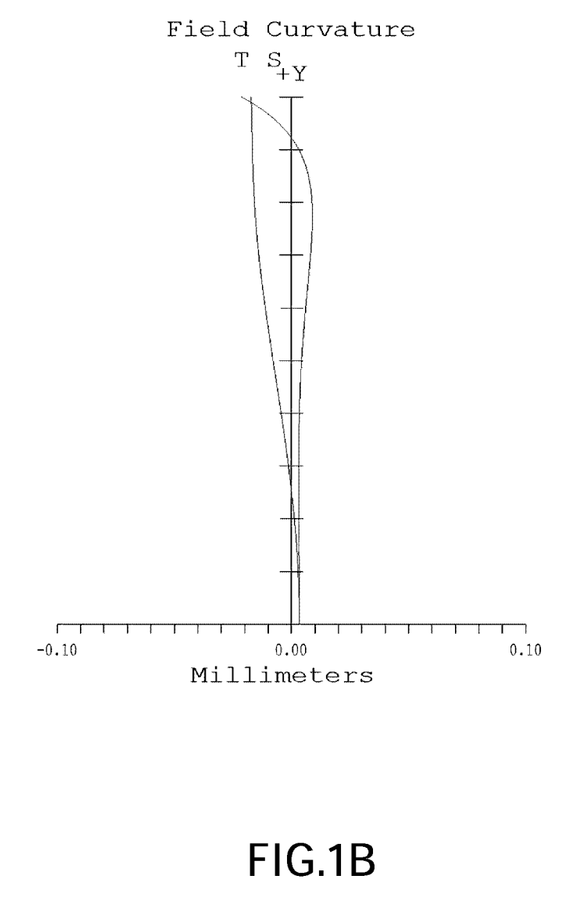
FIG. 1B is a diagram showing the field curvature of the optical imaging lens according to the first embodiment of the present invention.
Figure 1C:
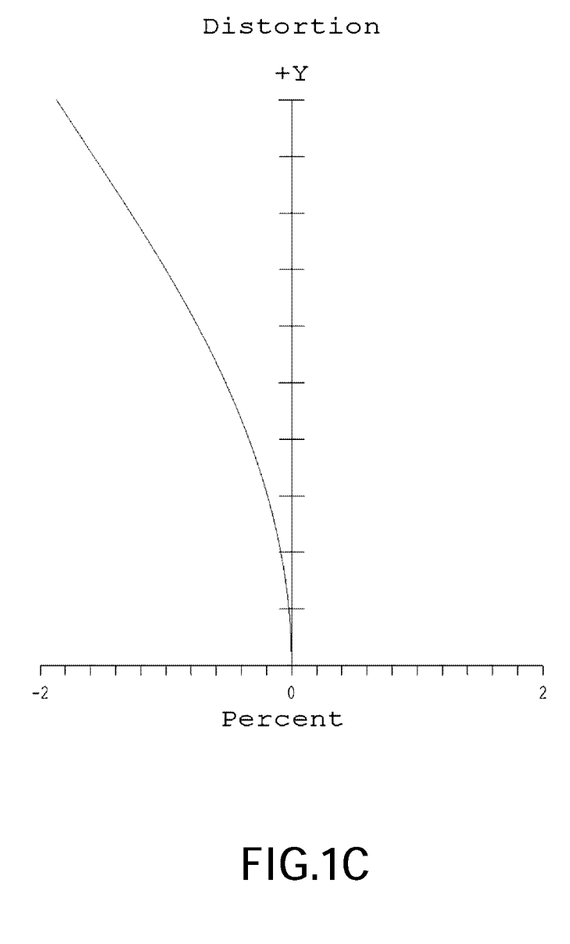
FIG. 1C is a diagram showing the distortion of the optical imaging lens according to the first embodiment of the present invention.
Figure 1D:
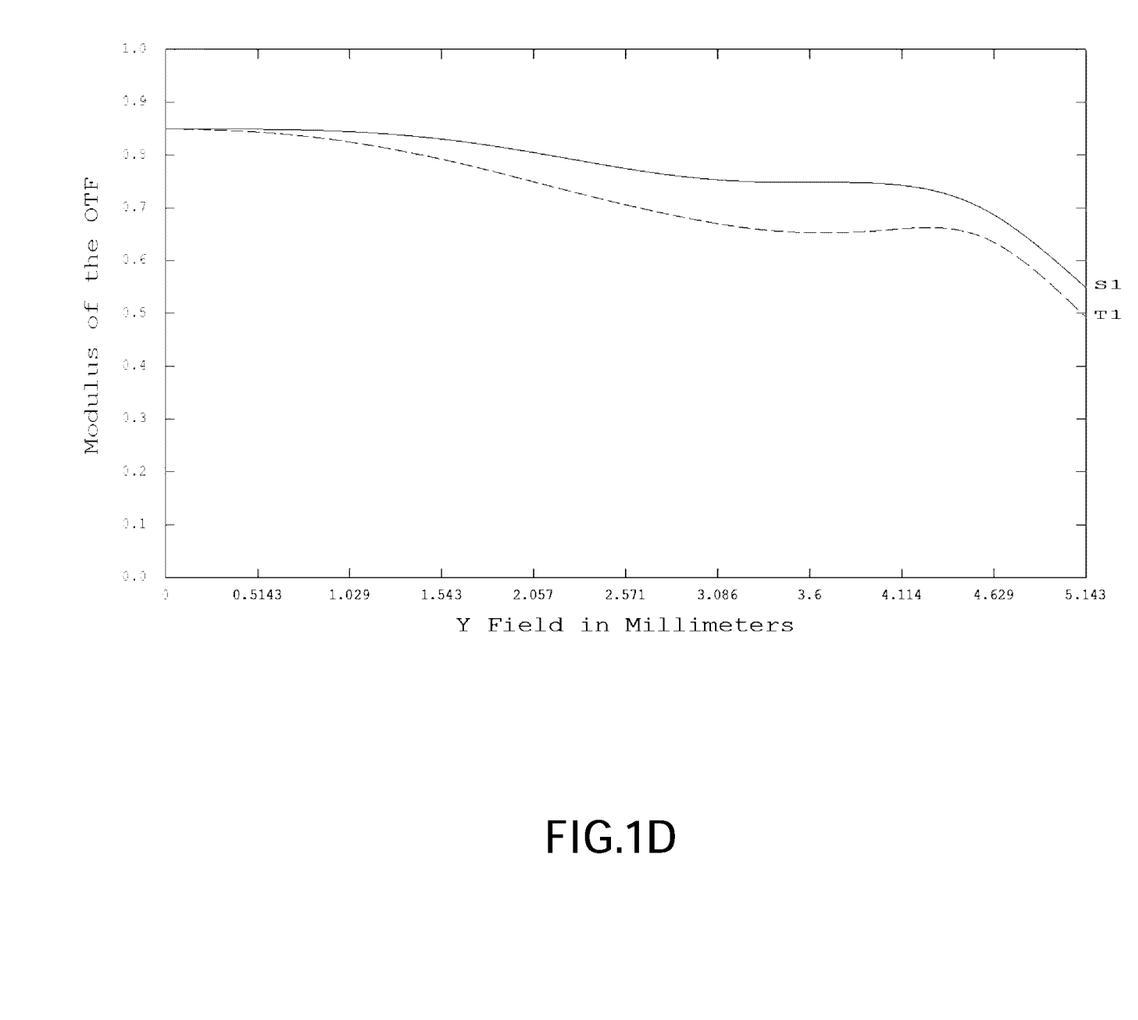
FIG. 1D is a diagram showing the modulator transfer function (MTF) of the optical imaging lens according to the first embodiment of the present invention.

With the aforementioned design, the first optical assembly C1, the second optical assembly C2, the third optical assembly C3, the fourth optical assembly C4, the fifth optical assembly C5, and the sixth optical assembly C6 satisfy the aforementioned conditions (1) to (6) of the optical imaging lens 100. Referring to FIG. 1B to FIG. 1D, with the aforementioned design, the optical imaging lens 100 according to the first embodiment of the present invention could effectively enhance image quality and lower a distortion thereof.

Figure 2A:
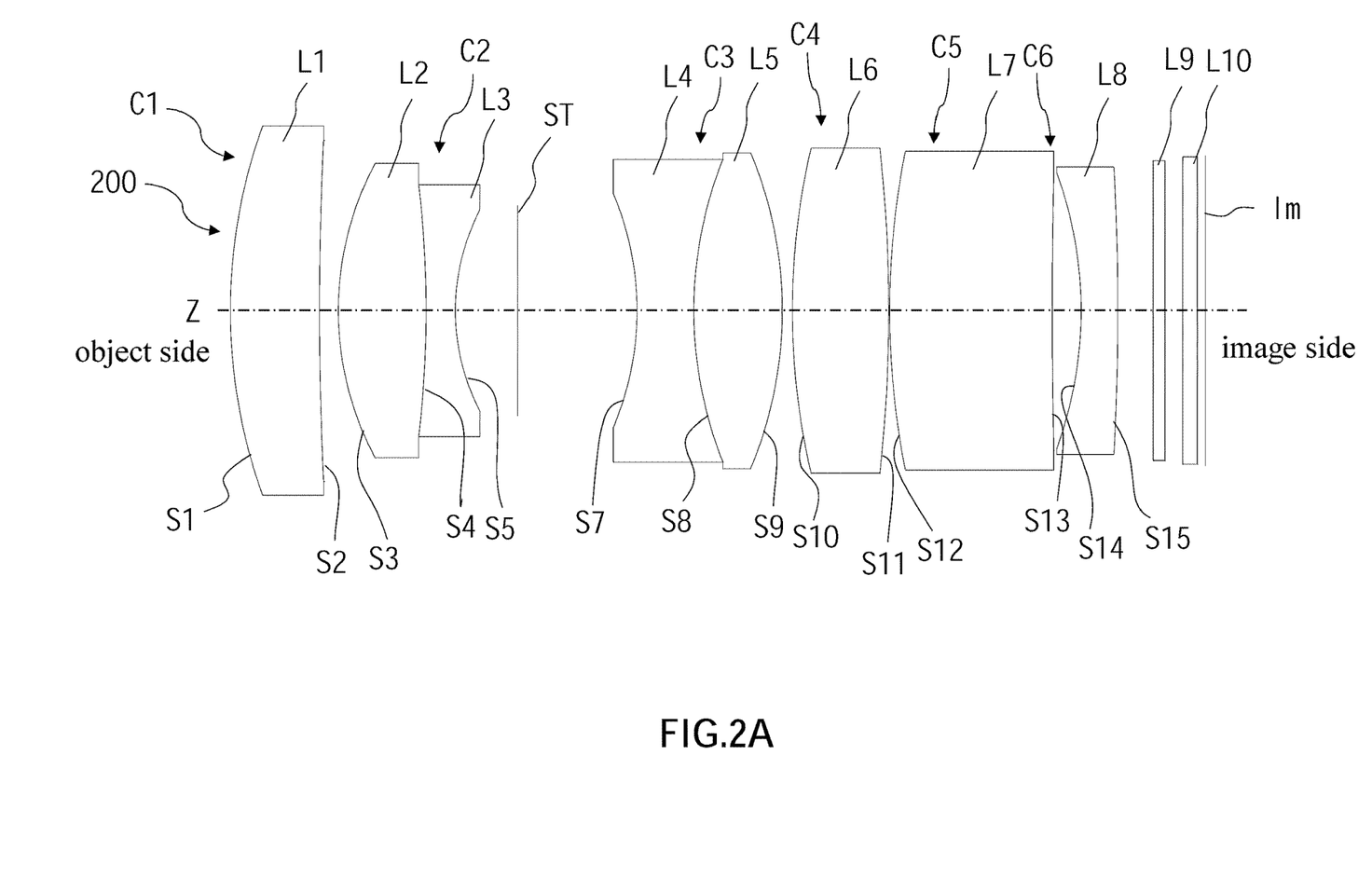
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first optical assembly C1, a second optical assembly C2, a third optical assembly C3, a fourth optical assembly C4, a fifth optical assembly C5, and a sixth optical assembly C6.

The first optical assembly C1 has positive refractive power. As shown in FIG. 2A, the first optical assembly C1 is a single lens including a first lens L1, wherein an object-side surface S1 of the first lens L1 is a convex surface, and an image-side surface S2 of the first lens L1 is a concave surface that is slightly concave toward the image side.

The second optical assembly C2 is a compound lens formed by adhering a second lens L2 and a third lens L3, which could effectively improve a chromatic aberration of the optical imaging lens 200. In the second embodiment, the second optical assembly C2 has negative refractive power, and the second lens L2 has positive refractive power, and the third lens L3 has negative refractive power. As shown in FIG. 2A, an object-side surface S3 of the second lens L2 is a convex surface, and an image-side surface S4 of the second lens L2 is a convex surface that is slightly convex toward the image side, and an object-side surface S4 of the third lens L3 is a concave surface that is slightly concave toward the object side, and an image-side surface S5 of the third lens L3 is a concave surface that is meniscus shaped, wherein the object-side surface S4 of the third lens L3 and the image-side surface S4 of the second lens L2 are adhered together to form the second optical assembly C2.

The third optical assembly C3 is a compound lens formed by adhering a fourth lens L4 and a fifth lens L5, which could effectively improve a chromatic aberration of the optical imaging lens 200. In the second embodiment, the third optical assembly C3 has positive refractive power, the fourth lens L4 has negative refractive power, and the fifth lens L5 has positive refractive power. As shown in FIG. 2A, the fourth lens L4 is a biconcave lens (i.e., an object-side surface S7 of the fourth lens L4 and an image-side surface S8 thereof are a concave surface), and the fifth lens L5 is a biconvex lens (i.e., an object-side surface S8 of the fifth lens L5 and an image-side surface S9 thereof are a convex surface), wherein the object-side surface S8 of the fifth lens L5 and the image-side surface S8 of the fourth lens L4 are adhered together to form the third optical assembly C3.

The fourth optical assembly C4 has positive refractive power. As shown in FIG. 2A, the fourth optical assembly C4 is a single lens including a sixth lens L6, wherein the sixth lens L6 is a biconvex lens (i.e., an object-side surface S10 of the sixth lens L6 and an image-side surface S11 thereof are a convex surface).

The fifth optical assembly C5 is a single lens including a seventh lens L7. In the second embodiment, the fifth optical assembly C5 has positive refractive power, wherein an object-side surface S12 of the seventh lens is a convex surface, and an image-side surface S13 of the seventh lens L7 is a concave surface that is slightly concave toward the image side.

The sixth optical assembly C6 has negative refractive power. In the second embodiment, the sixth optical assembly C6 is a single lens including an eighth lens L8, wherein as shown in 2A, the eighth lens L8 is a meniscus lens (i.e., an object-side surface S14 of the eighth lens L8 is a concave surface that is meniscus shaped, and an image-side surface S15 of the eighth lens L8 is a convex surface that is slightly convex toward the image side.

Additionally, the optical imaging lens 200 further includes an aperture ST, an infrared filter L9, and a protective glass L10, wherein the aperture ST is disposed between the third lens L3 of the second optical assembly C2 and the fourth lens L4 of the third optical assembly C3. The aperture ST is closer to the image-side surface S5 of the third lens L3 relative to the fourth lens L4. The infrared filter L9 is disposed between the eighth lens L8 and the protective glass L10 and is located at a side of the image-side surface S15 of the eighth lens L8 of the sixth optical assembly C6, wherein the infrared filter L9 is made of glass. The protective glass L10 is disposed at a side of the infrared filter L9 and is located between the infrared filter L9 and an image plane Im of the optical imaging lens 200.

In order to keep the optical imaging lens 200 in good optical performance and high imaging quality, the optical imaging lens 200 further satisfies:

$$1.47 > F/f1 > 0.14; \quad (1)$$

$$1.26 > F/f23 > -1.31,\ 1.83 > F/f2 > 0.52,\ -1.58 > F/f3 > -2.85; \quad (2)$$

$$0.86 > F/f45 > -0.43,\ -0.52 > F/f4 > -1.68,\ 1.94 > F/f5 > 0.64; \quad (3)$$

$$1.55 > F/f6 > 0.46; \quad (4)$$

$$1.07 > F/f7 > -0.17; \quad (5)$$

$$-0.42 > F/f8 > -1.86; \quad (6)$$

wherein F is a focal length of the optical imaging lens 200; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f8 is a focal length of the eighth lens L8; f23 is a focal length of the second optical assembly C2; f45 is a focal length of the third optical assembly C3.

Parameters of the optical imaging lens 200 of the second embodiment of the present invention are listed in the following Table 2, including the focal length (F) (also called an effective focal length (EFL)) of the optical imaging lens 200, a F-number (Fno), the maximal field of view (FOV), a radius of curvature (R) of each lens, a distance (D) between each surface and the next surface on the optical axis Z, a refractive index (Nd) of each lens, the focal length of each lens, and the cemented focal length of the second optical assembly C2 and the cemented focal length of the third optical assembly C3, wherein a unit of the focal length, the radius of curvature, and the distance is millimeter (mm).

TABLE 2

F = 20.96 mm; Fno = 2; FOV = 32 deg

| Surface | R(mm) | D(mm) | Nd | Focal length | Cemented focal length | Note |
|---|---|---|---|---|---|---|
| S1 | 19.35 | 3.02 | 1.99 | 21.7 | | L1 |
| S2 | 113.57 | 0.63 | 1 | | | |
| S3 | 10.59 | 2.97 | 1.61 | 18.55 | −26 | L2 |
| S4 | −37.28 | 0.99 | 1.79 | −8.91 | | L3 |
| S5 | 6.4 | 2.12 | 1 | | | |
| ST | Infinity | 4.04 | 1 | | | Aperture |
| S7 | −11.1 | 1.93 | 1.63 | −20.07 | 58.77 | L4 |
| S8 | 12.8 | 2.99 | 1.79 | 14.58 | | L5 |
| S9 | −12.8 | 0.34 | 1 | | | |
| S10 | 24.09 | 3.27 | 1.75 | 21.94 | | L6 |
| S11 | −49.21 | 0.03 | 1 | | | |
| S12 | 28.74 | 5.51 | 1.49 | 63.79 | | L7 |
| S13 | 220.47 | 0.97 | 1 | | | |
| S14 | −14.53 | 1.25 | 2.03 | −15.46 | | L8 |
| S15 | −87.06 | 1.18 | 1 | | | |
| S16 | Infinity | 0.4 | 1.52 | | | Infrared filter |
| S17 | Infinity | 0.6 | 1 | | | |
| S18 | Infinity | 0.5 | 1.52 | | | Protective glass |
| S19 | Infinity | 0.28 | 0 | | | |
| Im | Infinity | 0 | 0 | | | |

It can be seen from Table 2 that, in the second embodiment, the focal length (F) of the optical imaging lens 200 is 20.96 mm; the Fno of the optical imaging lens 200 is 2; the FOV of the optical imaging lens 200 is 32 degrees; f1=21.7 mm; f2=18.55 mm; f3=−8.91 mm; f4=−20.07 mm; f5=14.58 mm; f6=21.94 mm; f7=63.79 mm; f8=−15.46 mm; the focal length f23 of the second optical assembly C2 formed by adhering the second lens L2 and the third lens L3 is −26 mm; the focal length f45 of the third optical assembly C3 formed by adhering the fourth lens L4 and the fifth lens L5 is 58.77 mm.

Additionally, based on the above detailed parameters, detailed values of the aforementioned conditional formula in the second embodiment are as follows: F/f1=0.97; F/f2=1.13, F/f3=−2.35, and F/f23=−0.81; F/f4=−1.04, F/f5=1.44, and F/f45=0.36; F/f6=0.96; F/f7=0.33; F/f8=−1.36.

Figure 2B:
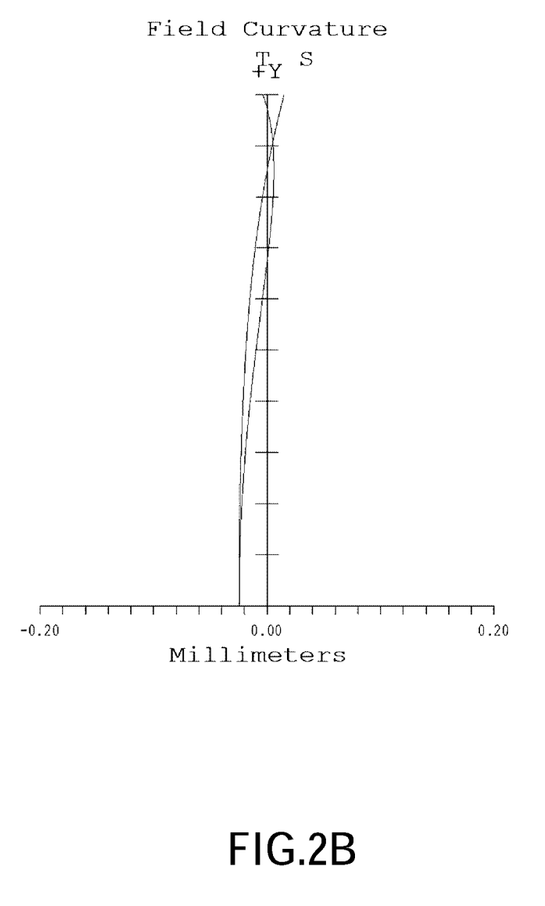
FIG. 2B is a diagram showing the field curvature of the optical imaging lens according to the second embodiment of the present invention.
Figure 2C:
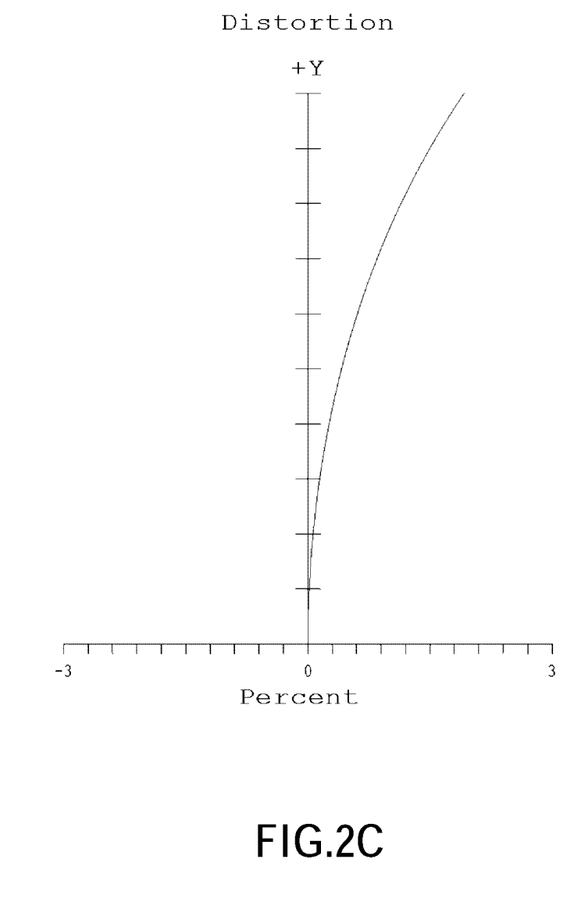
FIG. 2C is a diagram showing the distortion of the optical imaging lens according to the second embodiment of the present invention.
Figure 2D:
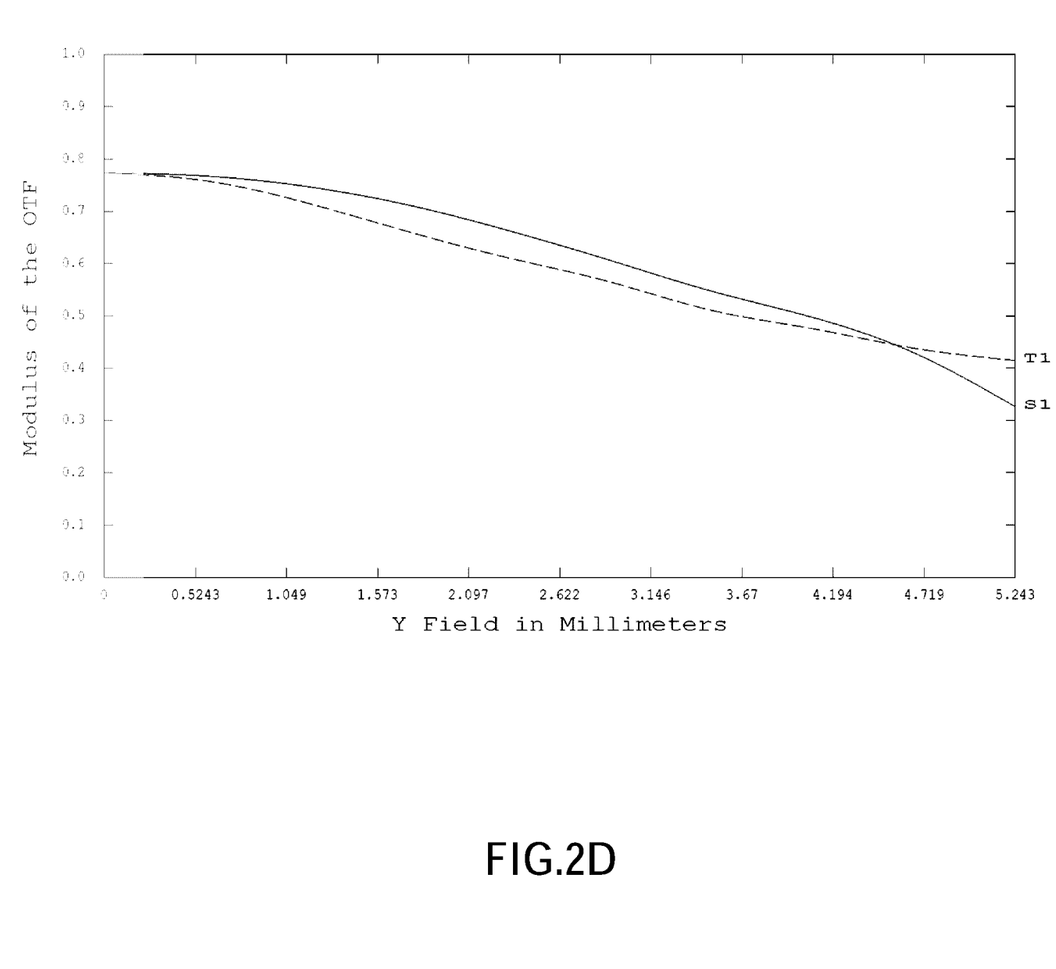
FIG. 2D is a diagram showing the modulator transfer function (MTF) of the optical imaging lens according to the second embodiment of the present invention.

With the aforementioned design, the first optical assembly C1, the second optical assembly C2, the third optical assembly C3, the fourth optical assembly C4, the fifth optical assembly C5, and the sixth optical assembly C6 satisfy the aforementioned conditions (1) to (6) of the optical imaging lens 200. Referring to FIG. 2B to FIG. 2D, with the aforementioned design, the optical imaging lens 200 according to the second embodiment of the present invention could effectively enhance image quality and lower a distortion thereof.

Figure 3A:
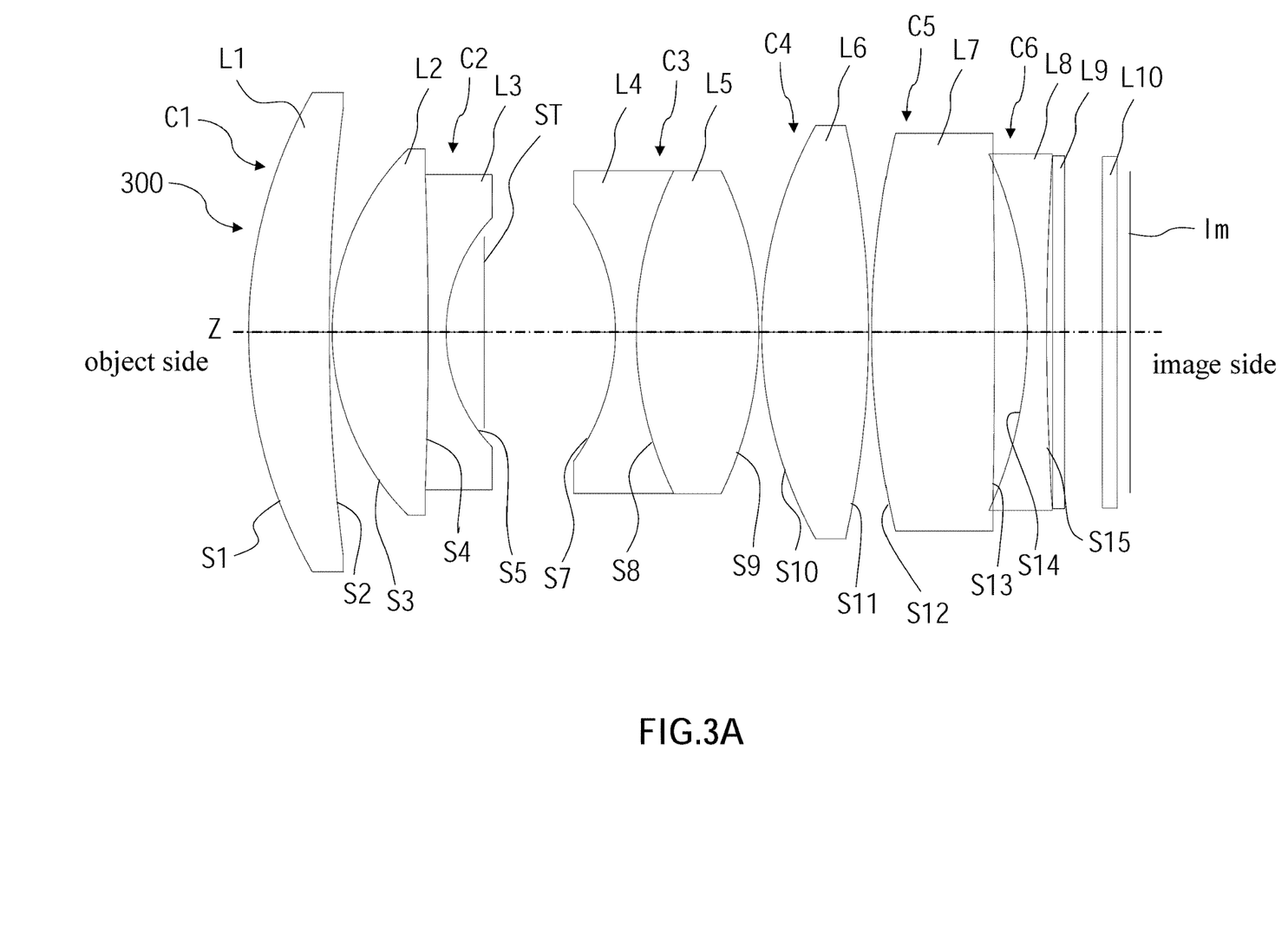
FIG. 3A is a schematic view of the optical imaging lens according to a third embodiment of the present invention.

An optical imaging lens 300 according to a third embodiment of the present invention is illustrated in FIG. 3A, which includes, in order along an optical axis Z from an object side to an image side, a first optical assembly C1, a second optical assembly C2, a third optical assembly C3, a fourth optical assembly C4, a fifth optical assembly C5, and a sixth optical assembly C6. In the current embodiment, two of the first optical assembly C1, the second optical assembly C2, the third optical assembly C3, the fourth optical assembly C4, the fifth optical assembly C5, and the sixth optical assembly C6 include a compound lens with at least two lenses, while the others thereof is a single lens.

The first optical assembly C1 has positive refractive power. As shown in FIG. 3A, the first optical assembly C1 is a single lens including a first lens L1, wherein an object-side surface S1 of the first lens L1 is a convex surface, and an image-side surface S2 of the first lens L1 is a concave surface.

The second optical assembly C2 is a compound lens formed by adhering a second lens L2 and a third lens L3, which could effectively improve a chromatic aberration of the optical imaging lens 300. In the third embodiment, the second optical assembly C2 has negative refractive power, and the second lens L2 has positive refractive power, and the third lens L3 has negative refractive power. As shown in FIG. 3A, an object-side surface S3 of the second lens L2 is a convex surface, and an image-side surface S4 of the second lens L2 is a convex surface that is slightly convex toward the image side, and an object-side surface S4 of the third lens L3 is a concave surface that is slightly concave toward the object side, and an image-side surface S5 of the third lens L3 is a concave surface that is meniscus shaped, wherein the object-side surface S4 of the third lens L3 and the image-side surface S4 of the second lens L2 are adhered together to form the second optical assembly C2.

The third optical assembly C3 is a compound lens formed by adhering a fourth lens L4 and a fifth lens L5, which could effectively improve a chromatic aberration of the optical imaging lens 300. In the third embodiment, the third optical assembly C3 has positive refractive power, and the fourth lens L4 has negative refractive power, and the fifth lens L5 has positive refractive power. As shown in FIG. 3A, the fourth lens L4 is a biconcave lens (i.e., an object-side surface S7 of the fourth lens L4 and an image-side surface S8 thereof are a concave surface), and the fifth lens L5 is a biconvex lens (i.e., an object-side surface S8 of the fifth lens L5 and an image-side surface S9 thereof are a convex surface), wherein the object-side surface S8 of the fifth lens L5 and the image-side surface S8 of the fourth lens L4 are adhered together to form the third optical assembly C3.

The fourth optical assembly C4 has positive refractive power. As shown in FIG. 3A, the fourth optical assembly C4 is a single lens including a sixth lens L6, wherein the sixth lens L6 is a biconvex lens (i.e., an object-side surface S10 of the sixth lens L6 and an image-side surface 511 thereof are a convex surface).

The fifth optical assembly C5 is a single lens including a seventh lens. In the third embodiment, the fifth optical assembly C5 has positive refractive power, and an object-side surface S12 of the seventh lens is a convex surface, and an image-side surface S13 of the seventh lens L7 is a concave surface that is slightly concave toward the image side.

The sixth optical assembly C6 has negative refractive power. In the third embodiment, the sixth optical assembly C6 is a single lens including an eighth lens L8. As shown in FIG. 3A, the eighth lens L8 is a meniscus lens (i.e., an object-side surface S14 of the eighth lens L8 is a concave surface that is meniscus shaped, and an image-side surface S15 of the eighth lens L8 is a concave surface that is slightly concave toward the image side.

Additionally, the optical imaging lens 300 further includes an aperture ST, an infrared filter L9, and a protective glass L10, wherein the aperture ST is disposed between the third lens L3 of the second optical assembly C2 and the fourth lens L4 of the third optical assembly C3. The aperture ST is closer to the image-side surface S5 of the third lens L3 relative to the fourth lens L4. The infrared filter L9 is disposed between the eighth lens L8 and the protective glass L10 and is located at a side of the image-side surface S15 of the eighth lens L8 of the sixth optical assembly C6 and is made of glass. The protective glass L10 is disposed at a side of the infrared filter L9 and is located between the infrared filter L9 and an image plane Im of the optical imaging lens 300.

In order to keep the optical imaging lens 300 in good optical performance and high imaging quality, the optical imaging lens 300 further satisfies:

$$1.47 > F/f1 > 0.14; \quad (1)$$

$$1.26 > F/f23 > -1.31, \ 1.83 > F/f2 > 0.52, \ -1.58 > F/f3 > -2.85; \quad (2)$$

$$0.86 > F/f45 > -0.43, \ -0.52 > F/f4 > -1.68, \ 1.94 > F/f5 > 0.64; \quad (3)$$

$$1.55 > F/f6 > 0.46; \quad (4)$$

$$1.07 > F/f7 > -0.17; \quad (5)$$

$$-0.42 > F/f8 > -1.86; \quad (6)$$

wherein F is a focal length of the optical imaging lens 300; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f8 is a focal length of the eighth lens L8; f23 is a focal length of the second optical assembly C2; f45 is a focal length of the third optical assembly C3.

Parameters of the optical imaging lens 300 of the third embodiment of the present invention are listed in the following Table 3, including the focal length (F) (also called an effective focal length (EFL)) of the optical imaging lens 200, a F-number (Fno), the maximal field of view (FOV), a radius of curvature (R) of each lens, a distance (D) between each surface and the next surface on the optical axis Z, a refractive index (Nd) of each lens, the focal length of each lens, and the cemented focal length of the second optical assembly C2 and the cemented focal length of the third optical assembly C3, wherein a unit of the focal length, the radius of curvature, and the distance is millimeter (mm).

TABLE 3

F = 16.36 mm; Fno = 1.6; FOV = 36 deg

| Surface | R(mm) | D(mm) | Nd | Focal length | Cemented focal length | Note |
|---|---|---|---|---|---|---|
| S1 | 16.13 | 2.69 | 1.84 | 25.66 | | L1 |
| S2 | 58.56 | 0.1 | 1 | | | |
| S3 | 9.66 | 3.22 | 1.7 | 12.33 | −44.02 | L2 |
| S4 | −133.3 | 0.6 | 1.7 | −7.88 | | L3 |
| S5 | 4.54 | 1.28 | 1 | | | |
| ST | Infinity | 4.39 | 1 | | | Aperture |
| S7 | −7.34 | 0.7 | 1.62 | −13.89 | 223.3 | L4 |
| S8 | 13.2 | 4.1 | 1.78 | 13.47 | | L5 |
| S9 | −11.2 | 0.1 | 1 | | | |
| S10 | 13.11 | 3.59 | 1.62 | 16.16 | | L6 |
| S11 | −30.16 | 0.1 | 1 | | | |
| S12 | 27.46 | 4.11 | 1.91 | 28.85 | | L7 |
| S13 | −311.8 | 1.1 | 1 | | | |
| S14 | −15.45 | 0.65 | 1.7 | −17.67 | | L8 |
| S15 | 91.53 | 0.2 | 1 | | | |
| S16 | Infinity | 0.4 | 1.53 | | | Infrared filter |
| S17 | Infinity | 1.25 | 1 | | | |
| S18 | Infinity | 0.5 | 1.53 | | | Protective glass |
| S19 | Infinity | 0.44 | 1 | | | |
| Im | Infinity | 0 | 1 | | | |

It can be seen from Table 3 that, in the third embodiment, the focal length (F) of the optical imaging lens 300 is 16.36 mm; the Fno of the optical imaging lens 300 is 1.6; the FOV of the optical imaging lens 300 is 36 degrees; f1=25.66 mm; f2=12.33 mm; f3=−7.88 mm; f4=−13.89 mm; f5=13.47 mm; f6=16.16 mm; f7=28.85 mm; f8=−17.67 mm; the focal length f23 of the second optical assembly C2 formed by adhering the second lens L2 and the third lens L3 is −44.02 mm; the focal length f45 of the third optical assembly C3 formed by adhering the fourth lens L4 and the fifth lens L5 is 223.3 mm.

Additionally, based on the above detailed parameters, detailed values of the aforementioned conditional formula in the third embodiment are as follows: F/f1=0.64; F/f2=1.33, F/f3=−2.08, F/f23=−0.37; F/f4=−1.18, F/f5=1.21, F/f45=0.07; F/f6=1.01; F/f7=0.57; F/f8=−0.93.

Figure 3B:
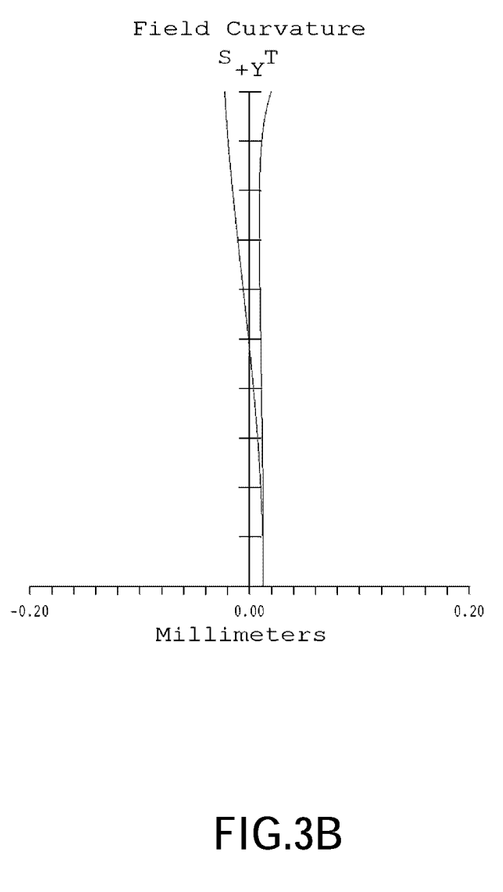
FIG. 3B is a diagram showing the field curvature of the optical imaging lens according to the third embodiment of the present invention.
Figure 3C:
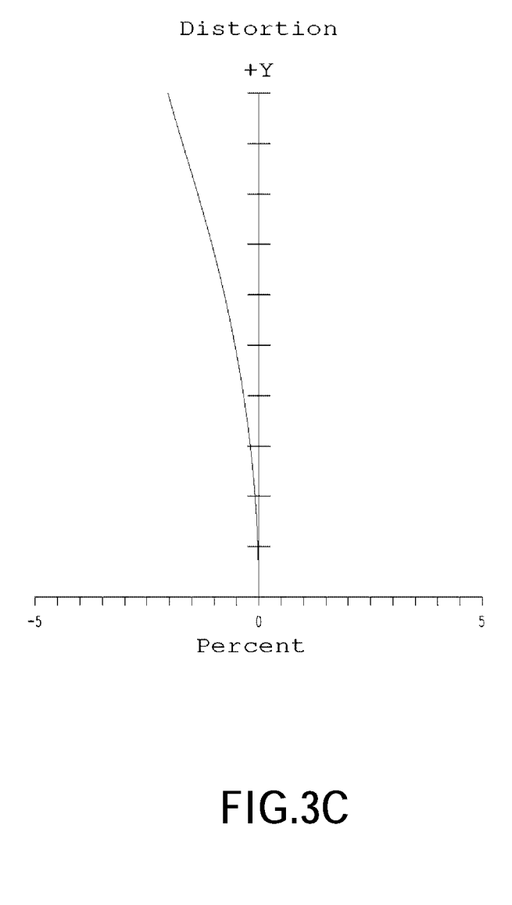
FIG. 3C is a diagram showing the distortion of the optical imaging lens according to the third embodiment of the present invention.
Figure 3D:
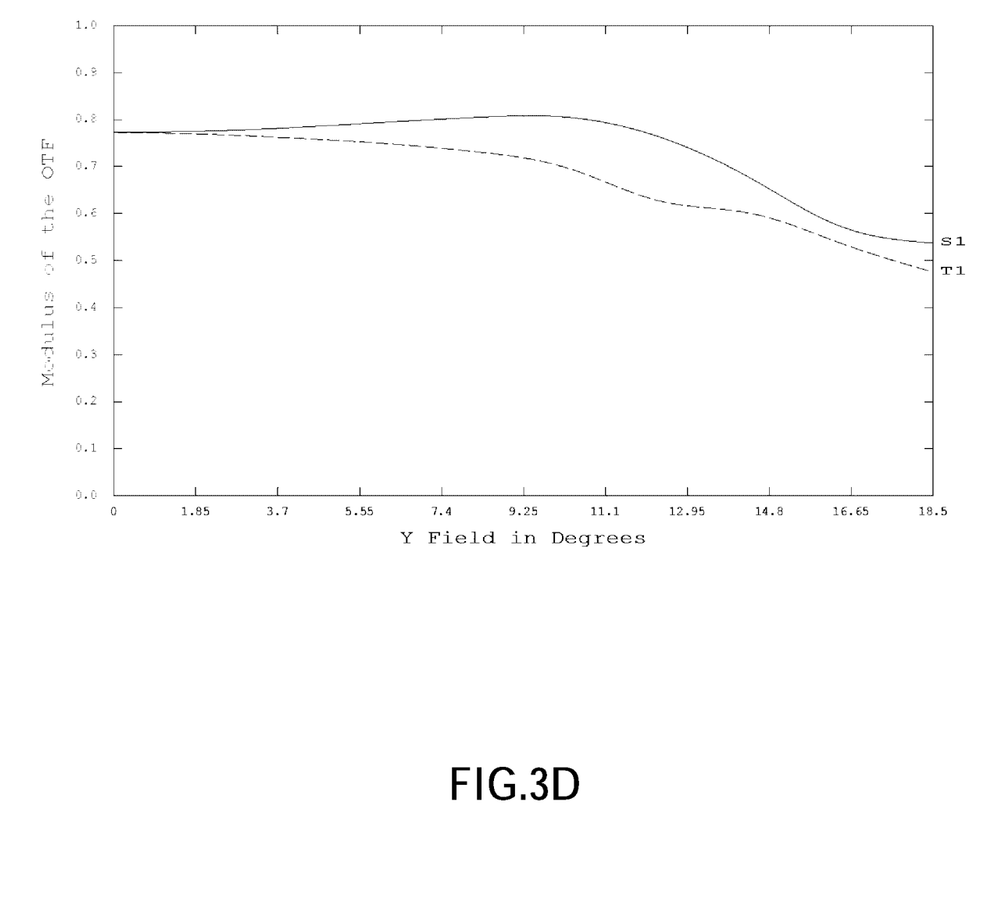
FIG. 3D is a diagram showing the modulator transfer function (MTF) of the optical imaging lens according to the third embodiment of the present invention.

With the aforementioned design, the first optical assembly C1, the second optical assembly C2, the third optical assembly C3, the fourth optical assembly C4, the fifth optical assembly C5, and the sixth optical assembly C6 satisfy the aforementioned conditions (1) to (6) of the optical imaging lens 300. Referring to FIG. 3B to FIG. 3D, with the aforementioned design, the optical imaging lens 300 according to the third embodiment of the present invention could effectively enhance image quality and lower a distortion thereof.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, comprising:
    a first optical assembly having positive refractive power;
    a second optical assembly having positive refractive power;
    a third optical assembly;
    a fourth optical assembly having positive refractive power;
    a fifth optical assembly; and
    a sixth optical assembly having negative refractive power;
    wherein two of the first optical assembly, the second optical assembly, the third optical assembly, the fourth optical assembly, the fifth optical assembly, and the sixth optical assembly comprise a compound lens with at least two lenses, while the remaining four optical assemblies consist of a single lens; the optical imaging lens satisfies: 1.47>F/f1>0.14; 1.55>F/f6>0.46; −0.42>F/f8>−1.86; F is a focal length of the optical imaging lens; f1 is a focal length of the first optical assembly; f6 is a focal length of the fourth optical assembly; f8 is a focal length of the sixth optical assembly.

2. The optical imaging lens as claimed in claim 1, wherein the first optical assembly is a single lens comprising a first lens; the second optical assembly is a compound lens formed by a second lens and a third lens; the third optical assembly is a compound lens formed by a fourth lens and a fifth lens; the fourth optical assembly is a single lens comprising a sixth lens; the fifth optical assembly is a single lens comprising a seventh lens; the sixth optical assembly is a single lens comprising an eighth lens.

3. The optical imaging lens as claimed in claim 2, wherein the second lens has positive refractive power; the third lens has negative refractive power.

4. The optical imaging lens as claimed in claim 3, wherein the optical imaging lens satisfies: 1.83>F/f2>0.52; wherein f2 is a focal length of the second lens.

5. The optical imaging lens as claimed in claim 3, wherein the optical imaging lens satisfies: −1.58>F/f3>−2.85; wherein f3 is a focal length of the third lens.

6. The optical imaging lens as claimed in claim 2, wherein the fourth lens has negative refractive power; the fifth lens has positive refractive power.

7. The optical imaging lens as claimed in claim 6, wherein the optical imaging lens satisfies: −0.52>F/f4>−1.68; wherein f4 is a focal length of the fourth lens.

8. The optical imaging lens as claimed in claim 6, wherein the optical imaging lens satisfies: 1.94>F/f5>0.64; wherein f5 is a focal length of the fifth lens.

9. The optical imaging lens as claimed in claim 1, the third optical assembly has positive refractive power; the fifth optical assembly has positive refractive power.

10. The optical imaging lens as claimed in claim 2, wherein the third optical assembly has positive refractive power; the fifth optical assembly has positive refractive power.

11. The optical imaging lens as claimed in claim 2, wherein the optical imaging lens satisfies: 1.26>F/f23>−1.31; wherein f23 is a focal length of the second optical assembly.

12. The optical imaging lens as claimed in claim 2, wherein the optical imaging lens satisfies: 0.86>F/f45>−0.43, wherein f45 is a focal length of the third optical assembly.

13. The optical imaging lens as claimed in claim 2, wherein the optical imaging lens satisfies: 1.07>F/f7>−0.17, wherein f7 is a focal length of the fifth optical assembly.

14. An optical imaging lens, in order from an object side to an image side along an optical axis, comprising:
    a first lens having positive refractive power, wherein an object-side surface of the first lens is a convex surface;
    a second lens having positive refractive power, wherein an object-side surface of the second lens is a convex surface;
    a third lens having negative refractive power, wherein an image-side surface of the third lens is a concave surface; an object-side surface of the third lens and an image-side surface of the second lens are adhered together to form a second optical assembly having positive refractive power;
    a fourth lens having negative refractive power, wherein the fourth lens is a biconcave lens;
    a fifth lens having positive refractive power, wherein the fifth lens is a biconvex lens; an object-side surface of the fifth lens and an image-side surface of the fourth lens are adhered together to form a third optical assembly;
    a sixth lens having positive refractive power, wherein the sixth lens is a biconvex lens;
    a seventh lens, wherein an object-side surface of the seventh lens is a convex surface; and
    an eighth lens having negative refractive power, wherein an object-side surface of the eighth lens is a concave surface.

15. The optical imaging lens as claimed in claim 14, wherein the optical imaging lens satisfies: 1.83>F/f2>0.52, wherein F is a focal length of the optical imaging lens; f2 is a focal length of the second lens.

16. The optical imaging lens as claimed in claim 14, wherein the optical imaging lens satisfies: −1.58>F/f3>−2.85, wherein F is a focal length of the optical imaging lens; f3 is a focal length of the third lens.

17. The optical imaging lens as claimed in claim 14, wherein the optical imaging lens satisfies: −0.52>F/f4>−1.68, wherein F is a focal length of the optical imaging lens; f4 is a focal length of the fourth lens.

18. The optical imaging lens as claimed in claim 14, wherein the optical imaging lens satisfies: 1.94>F/f5>0.64, wherein F is a focal length of the optical imaging lens; f5 is a focal length of the fifth lens.

19. The optical imaging lens as claimed in claim 14, wherein the third optical assembly has positive refractive power; the seventh lens has positive refractive power.

20. The optical imaging lens as claimed in claim 14, wherein the optical imaging lens satisfies: 1.26>F/f23>−1.31, wherein F is a focal length of the optical imaging lens; f23 is a focal length of the second optical assembly.

21. The optical imaging lens as claimed in claim 14, wherein the optical imaging lens satisfies: 0.86>F/f45>−0.43, wherein F is a focal length of the optical imaging lens; f45 is a focal length of the third optical assembly.

22. The optical imaging lens as claimed in claim 14, wherein the optical imaging lens satisfies: 1.07>F/f7>−0.17, wherein F is a focal length of the optical imaging lens; f7 is a focal length of the seventh lens.

23. The optical imaging lens as claimed in claim 14, wherein the optical imaging lens satisfies: 1.47>F/f1>0.14, 1.55>F/f6>0.46, and −0.42>F/f8>−1.86, wherein F is a focal length of the optical imaging lens; f1 is a focal length of the first lens; f6 is a focal length of the sixth lens; f8 is a focal length of the eighth lens.

* * * * *